Figure 1:
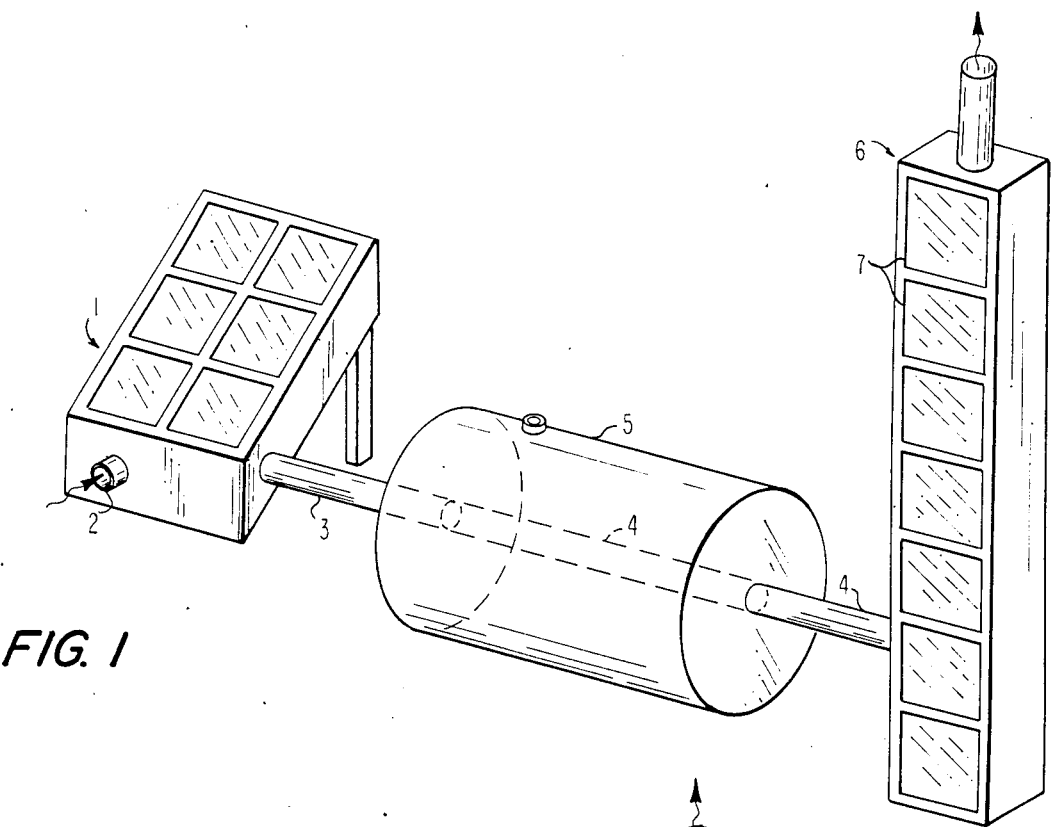

United States Patent [19]

O'Hare

[11] Patent Number: 4,681,089
[45] Date of Patent: Jul. 21, 1987

[54] CONVECTION POWERED SOLAR HEATER FOR WATER TANKS

[76] Inventor: Louis R. O'Hare, 7425 N. Mona Lisa Rd. #156, Tucson, Ariz. 85741

[21] Appl. No.: 250,943

[22] Filed: Apr. 6, 1981

[51] Int. Cl.[4] ................................................ F23J 3/02
[52] U.S. Cl. ..................................... 126/434; 126/417; 126/435
[58] Field of Search ............... 126/417, 428, 429, 432, 126/434, 435, 437

[56] References Cited

U.S. PATENT DOCUMENTS

| 117,476 | 7/1871 | Sperry | 126/432 |
|---|---|---|---|
| 2,553,073 | 5/1951 | Barnett | 126/434 |
| 3,146,774 | 9/1964 | Yellott | 126/432 |
| 4,108,160 | 8/1978 | Harper | 126/435 X |
| 4,243,023 | 1/1981 | Rom et al. | 126/449 |
| 4,253,801 | 3/1981 | O'Hare | 165/45 X |
| 4,301,788 | 11/1981 | Hummel | 126/435 |
| 4,309,986 | 1/1982 | Eastman et al. | 126/433 |

Primary Examiner—Larry Jones

[57] ABSTRACT

A solar heated convection column in the form of a long rectangular black box collector with its length disposed vertically is used to produce a draft of air entering at the bottom and exiting at the top and the low pressure draft at the bottom of the column is used to draw hot air heated by a second solar black box heater through a heat exchanging tube passing through water in a water tank, the novelty and utility of this system being derived from its ability to enable the use of convection energy for moving fluids in those cases in which the heat source is significantly higher than the object to be heated. Hot air is here drawn horizontally and even downward to heat water at or below the level of a solar heat source.

9 Claims, 3 Drawing Figures

CONVECTION POWERED SOLAR HEATER FOR WATER TANKS

This invention relates to a plurality of fluid moving systems based on convection currents in that it employs the energy of rising heated fluids to do useful work. In this way it resembles a chimney or smoke stack since a column of heated air, which rises by virtue of its being hotter and lighter than ambient air, is used to draw cooler oxygen-rich air through combusting material in the firebed of a furnace. Similarly, this invention resembles systems that use convective loops to circulate air through buildings when heated air is available at a lower level. In these loops the air heated at a lower level cools as it rises and as it loses heat to the objects being heated the cooled air then descends to a heat source below where it is reheated. However, this present system is similar only in that the work of moving heat bearing air is accomplished by rising air, but this present system is different in that the source of the heat energy is not at a lower level of elevation than the object to be heated. Secondly, this present system is not in the form of a closed loop. That is to say the solar heated air that transfers its heat to objects being heated, and in so doing becomes cooled in the process, does not return again to the same heater for repeated heating. On the contrary the open convection system of this present invention has one heater to heat the air which transfers its heat to the objects to be heated and in the process becomes cooled. This cooled air with most of its heat gone can no longer provide energetic convection; therefore, in this present invention that air which has accomplished the heating and become cooled is again reheated in a separate heater solely for the purpose of enabeling it to provide an energetic convection draft. The open loop convection draft caused by this second heating in this present system is more energetic because the air rising up the convection column is hotter and therfore lighter than air in a corresponding closed loop system and accordingly will rise more readily to produce a stronger draft. While the system of this present invention is an open system and not a closed loop system nevertheless it is not a conventional open convection system. In a conventional open convecting system, air heated at a lower elevation merely rises and heats various objects as it flows across them in its generally upward movement. On the other hand in this present invention this second heating in a distinctly separate heater enables heated air from the first heater to be drawn in any direction whatsoever either upwards or downwards or horizontally. In this present inventive concept heated air may be moved for a distance downward and against its convective tendency. This is because that second heater at the base of a long convection column is able to provide a sufficiently energetic draft to pull even hot air downwards for a short distance. (Provided that the distance downwards is not as great as the height of the convection column.) Also this present invention resembles the invention of U.S. Pat. No. 4,253,801 called, "Series Convection Pump". It is similar in that heating of air to provide convection energy is done separately from the heating of air for heat transfer. In that former patent a series of hot and cold columns are used to accumulate pressure in order to force air into a solar collector or into storage etc. On the other hand this present invention uses a simple, single column to draw air from a hot source over a body to be heated. This invention uses the draft at the bottom of a convection column instead of using the outflow of a series of convection tubes. The use of a draft rather than a pressure removes the requirement of providing cooling for the downward convecting air of the former patent. This present system is a less complicted system for those cases in which less energy is required to move a mass of air.

The special utility of this present invention consists in that it enables the use of convection for heat transfer in a whole variety of cases in which convection could otherwise not be used. That is to say it enables the use of convection for heat transfer in those cases in which there is a requirement or an advantage in having an elevated heat source. It answers the questions, how does one use heat to move heat energy downwards when heated fluids ordinarily become lighter and tend to rise? For example in one embodiment of the basic inventive concept, solar black box air collectors at the most convenient place on the roof of a house are used to heat water in a hot water tank located in the house. The air heated on the roof is drawn down to the water tank by a draft from a separately heated convection column. The convection column producing the draft extends from the level of the collectors to a height significantly above the height of the collectors. This use of a convection column to draw air heated by a separate heater corresponds to similar usage in my copending applications, Ser. Nos. 198,359 and 184,205. In these applications the same draft from a convection column is used to draw both cooled and heated air across mechanisms that depend on temperature variation, but which are not necessarily burdened by the constraint of having to solve a heat transfer problem in which the heat source is at a higher elevation than the objects to be heated.

In another embodiment of this inventive concept the solar heating for a swimming pool is accomplished by the energy saving means of using convection draft. Limited space around the pool indicates the need to elevate the collectors from the pool level area. Solar heated convection columns are used to draw heated air from conventional solar air heaters through heat exchanging tubes in contact with pool water. In a similar manner fish ponds are to be heated by drawing hot air from collectors through pipes in the ponds. Similarily, in the case of solar space heating, a large water tank located in the basement or lower levels of the house may be heated by drawing solar heated air through heat exchanging tubes in the tank. A solar heated convection column on the side of the house in the manner of a chimney is used to produce the draft that draws air off of roof top collectors and through the water tank. In another embodiment the collectors that provide the air to heat the tank are located along the side of the house or in the yard and hot air is drawn from them through the tank by a solar heated convection column that extends up to the roof. In one embodiment the solar heated convection column is heated along its entire vertical length and in another embodiment it is heated by solar collectors at its base and the remaining vertical length is insulated to retain the heat of the air rising within. Again in a special embodiment of the basic inventive concept microbal culture tanks below the surface of the earth are heated by solar heated air that is moved by convection down to the underground tanks. Solar air heating collectors located above the surface of the earth heat air and a solar heated convection column produces a draft which draws this heated air down and through heat exchanging pipes extending through the tank containing the biomass. The solar heated air drawn through the tank is cooled in the process of transferring its heat to the biomass but the draft from a tall solar heated convection column is sufficient to draw the cooled air upward through a duct attached to the base of that convection column. This is the same type of energetic draft produced in a tall chimney when it draws air through densely packed coals in the firebed of a furnace, but in this case a draft of similar strength is used to draw hot air downwards for heating purposes. Similarily, single cell protein cultures that require heat may be heated indoors in sanitary conditions when outdoor solar heated air is drawn through ducting from the collectors and through the tanks to the convection column. The convection column itself is heated by separate collectors out of doors.

In each embodiment the amount of heating may of course be controlled by the rate of air flow, by the size of the solar air heating collectors as well as by the height and the heating of the solar heated convection column. The rate of air flow is controlled by the size of the ducting. Valves may be placed in the ducts to further control air flow rate. When collector area is very large or when consentrating collectors are employed at the same time that the air flow rate is kept very slow then very high temperature air may be made to flow through the ducting and the water tank is replaced by a cooking vessel or an oven heated by the hot air duct passing through it to provide an indoor solar heated cooker or oven. The inventive concept will be clarified further by reference to the drawings.

FIG. 1 of the drawings shows an open cycle convection system in which the heater that heats the air to carry heat is shown to be distinct and separate from the heater that is used to provide a convection draft.

Figure 2:
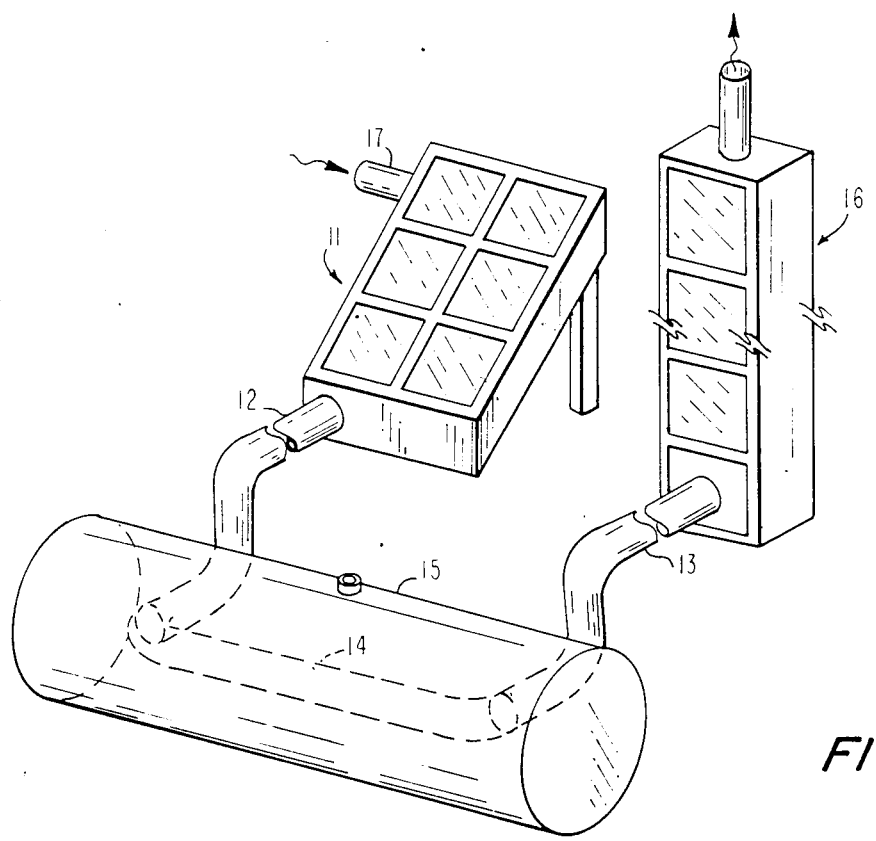

FIG. 2 of the drawings shows the elements of FIG. 1 but with the solar heaters removed to an area above and at a distance from the tank being heated.

Figure 3:
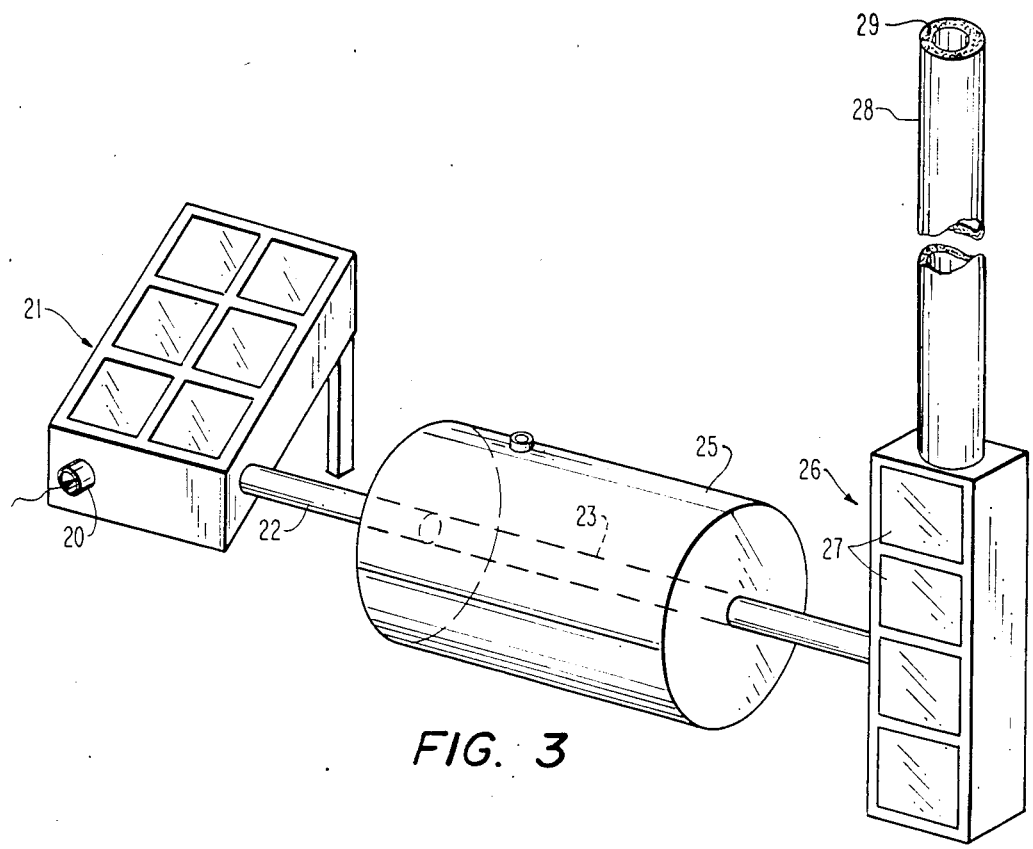

FIG. 3 of the drawings shows an alternate type of solar heated convection column in which the heater providing solar heated air for a convective draft is located at the base of the convection column only.

Referring then to FIG. 1, the black box solar air heater 1 receives ambient air through duct 2 and it exits heated air through exit duct 3 into heat transfer tube 4 which conducts the heated air through tank 5 thereby heating water in tank 5 and at the same time cooling the air used for heat transfer. The air that has given up its heat in heating the tank is drawn into solar heated convection column 6 by the heated, rising air in 6 being heated by the light that passes through collecting panels 7. Column 6 is shown in a vertical position but it can also operate tilted back as collector 1 is tilted back.

Referring then to FIG. 2 of the drawings, solar heated convection column 16 corresponds to column 6 of FIG. 1, but in this FIG. 2 the column 16 is shown in a remote and elevated position to illustrate the principle that it may be removed to a distance from the tank through which it is able to draw the heated air. It may also be located over the tank through which it is drawing heated air. Similarily, black box collector solar heater 11 corresponds to collector 1 of FIG. 1 but in this FIG. 2 the heater 11 is shown in a remote position from the tank 15 to which it is supplying heat. This is for the purpose of illustrating that the solar heater too may be remoted and elevated above the tank to which it is providing heat because the upward flow of air in the convection column is long enough and energetic enough to provide a sufficiently energetic draft to draw even hot air from the solar heater some distance downward. In this FIG. 2 heated air enters 15 through duct 12 and exits from 15 through heat transfer duct 13 through which it is drawn by the light, heated air rising in 16. Duct 17 inlets ambient air into solar heater 11. Ducts 12 and 13 are insulated. Duct 14 is the heat transfer duct through tank 15.

Referring then to FIG. 3 of the drawings, solar heated convection column 26 corresponds to column 6 of FIG. 1 but in this FIG. 3 the column is structured somewhat differently in that the heating of the air produce the convection in the column is accomplished at the base of the column by the solar collector panels 27 at the base of the column 26 rather than by panels extending the entire vertical length of the column as is the case in FIG. 1 with column 6. In this FIG. 3 the exit duct 28 of convection heating collector 26 is a very elongated exit duct in the form of a long cylindrical tube that has an insulated covering throughout its length 29. The air heated in 26 rises in 26 and, because it retains its heat, continues to rise in 28 producing a draft in heat transfer duct 23 drawing solar heated air through tank 25 from collector-heater 21. The duct 22 provides fluid flow communication between 21 and 25. Inlet air is drawn into the collector 21 through duct 20. The description of 25 as a water tank is not meant to limit the invention. 25 could be a boiler or a fish tank or a swimming pool etc.

I claim:
1. A passive solar water tank heater comprising:
   (1) a solar air heater in the form of a black box solar collector having an inlet port to receive ambient air as well as exit ducting by which it is placed in fluid flow communication with
   (2) a heat exchanging means in the form of a pipe extending through water in a water tank thereby conducting to the water heat from air circulating in the pipe, which air is being drawn through said heat exchanging means by an energetic draft from
   (3) a draft production means comprising a solar heated black box collector in the form of a column having an air exit port on top and an air inlet duct on the bottom, with said top port being so elevated in height over the lower inlet duct as to cause to form within said collector a column of upward convecting air and thereby to produce a low pressure area within at its base, and said draft producing means both of such a vertical length as to provide an air column sufficiently long and energetic as to produce a draft at its base sufficient to draw even hot air some distance downward and of sufficient energy as to be capable of drawing a current of air through the heat exchanging means from the solar air heater means to thereby provide an open cycle air circulation in which the heat exchanging means is intermediate in a serial series fluid flow communication between the solar air heater and the draft production means and in which the heated air heated in the solar air heater is drawn into thermal communication with the heat exchanging means to heat the water and in which said draft production means, in the form of a black box collector, is a long rectangular black box collector disposed with its length extending vertically in such a manner that air entering the inlet duct at its base is heated by solar energy and rises upward in a convection column to exit through the exit port on the top.

2. A passive solar powered water tank heater comprising:
(1) a solar air heater means in the form of a black box solar collector having an inlet port to receive ambient air as well as exit ducting by which it is placed in fluid flow communication with
(2) a heat exchanging means in the form of a pipe extending through water in a water tank thereby conducting to the water heat from air circulating in the pipe, which air is being drawn through said heat exchanging means by an energetic draft from
(3) a draft production means comprising a solar heated black box collector in the form of a column having an air exit port on top and an air inlet duct on the bottom, with said top being so elevated in height over the lower inlet duct as to cause to form within said collector a column of upward convecting air and thereby to produce a low pressure area within at its base, and said draft producing means being both of such a vertical length as to provide an air column sufficiently long and energetic as to produce a draft at its base sufficient to draw even hot air some distance downward and of sufficient energy as to be capable of drawing a current of air through the heat exchanging means from the solar air heater means to thereby provide an open cycle air circulation in which the heat exchanging means is intermediate in a serial series fluid flow communication between the solar air heater and the draft production means and in which the heated air heated in the solar air heater is drawn into thermal communication with the heat exchanging means to heat the water.

3. A passive solar water tank heater as in claim 2 in which the inlet ducting to the draft production means and to the heat exchanging means in the water tank are long lengths of insulated ducting.

4. A passive solar energy water tank heater as in claim 2 in which the draft production means is a solar heated black box collector in the form of a column having an exit port on the top which exit port is a long cylindrical tube with its length extending vertically upwards, said tube being insulated to retard heat loss and said tube being capable of ducting upwards in a convecting column that air heated by the solar collector at its base.

5. A passive solar energy water tank heater as in claim 2 in which the heat exchanging means a hot air transporting duct extending through biomass material in a biomass generator such as a methane generator, and the water tank is a biomass generating tank containing biomass as well as water.

6. A passive solar energy water tank heater as in claim 2 in which the water tank is a domestic water heater tank used for home water heating.

7. A passive solar energy water tank heater as in claim 2 in which the water tank is a swimming pool and the heat exchanging means is a hot air transporting duct extending through the water in the swimming pool.

8. A passive solar water tank heater as in claim 2 in which the water tank is a cooking vessel and the heat exchanging means is a hot air conducting duct in heat transfer contact with the vessel.

9. A passive solar energy water tank heater as in claim 2 in which the heat exchanging means is in the form of a pipe extending through water in a microbal culture tank with said pipe being capable of conducting heat to the microbal cultures in the water and the water tank is a microbal culture tank.

* * * * *